US 8,281,288 B1
Oct. 2, 2012

(12) United States Patent
Spencer

(10) Patent No.: US 8,281,288 B1
(45) Date of Patent: Oct. 2, 2012

(54) INTEGRATED DEVELOPMENT ENVIRONMENT WITH NETWORK-BASED COMPILATION AND SANDBOXED NATIVE MACHINE-LANGUAGE CAPABILITIES

(75) Inventor: Greg Spencer, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/278,011

(22) Filed: Oct. 20, 2011

(51) Int. Cl.
*G06F 9/44* (2006.01)
*G06F 15/16* (2006.01)

(52) U.S. Cl. ........ 717/140; 717/106; 717/109; 709/201; 709/203

(58) Field of Classification Search .......... 717/106–113, 717/124–161; 709/201–203
See application file for complete search history.

(56) References Cited

U.S. PATENT DOCUMENTS

| | | | |
|---|---|---|---|
| 6,874,146 B1 | 3/2005 | Iyengar | |
| 7,454,744 B2 | 11/2008 | Bhogal et al. | |
| 7,596,620 B1* | 9/2009 | Colton et al. | 709/226 |
| 7,640,533 B1 | 12/2009 | Lottero et al. | |
| 7,716,640 B2 | 5/2010 | Pik et al. | |
| 8,046,741 B2 | 10/2011 | Bhogal et al. | |
| 2005/0120334 A1 | 6/2005 | Deboer | |
| 2005/0262480 A1 | 11/2005 | Pik et al. | |
| 2006/0059469 A1* | 3/2006 | Schumacher | 717/127 |
| 2006/0242077 A1 | 10/2006 | Dettinger et al. | |
| 2008/0005683 A1 | 1/2008 | Aoki | |
| 2008/0134158 A1* | 6/2008 | Salz et al. | 717/148 |
| 2009/0103902 A1 | 4/2009 | Matsuura et al. | |
| 2010/0023926 A1 | 1/2010 | Sugawara et al. | |
| 2010/0042670 A1* | 2/2010 | Kamalakantha et al. | 709/203 |
| 2010/0217839 A1 | 8/2010 | Kawabe et al. | |
| 2011/0153824 A1* | 6/2011 | Chikando et al. | 709/226 |
| 2011/0265077 A1* | 10/2011 | Collison et al. | 717/172 |
| 2011/0265164 A1* | 10/2011 | Lucovsky et al. | 726/7 |
| 2011/0271067 A1* | 11/2011 | Chou et al. | 711/162 |

FOREIGN PATENT DOCUMENTS

GB    2130406 A  *  5/1984

OTHER PUBLICATIONS

"Online Development Studio—CodeRun," [http://www.coderun.com/studio/], 2009, p. 1-3.*
"CodeRun Cloud Add-in for Visual Studio," [http://www.coderun.com/cloud/add-in/], 2009, p. 1.*

(Continued)

*Primary Examiner* — Wei Zhen
*Assistant Examiner* — Qing Chen
(74) *Attorney, Agent, or Firm* — Sterne Kessler Goldstein & Fox

(57) ABSTRACT

An IDE is provided by a web browser on a client machine, the IDE having a document editor that allows a user to generate source code. The source code is transmitted from the client machine to one or more servers via a network connection to be compiled into compiled native machine instructions. The compiled native machine instructions are received from the one or more servers by the client machine. The compiled native machine instructions are executed in a sandboxed environment on the client machine, such that system calls originating from the compiled native machine instructions that present a security risk are blocked using the sandboxed environment and system calls originating from the compiled native machine instructions that do not present a security risk are allowed in the sandboxed environment.

15 Claims, 4 Drawing Sheets

OTHER PUBLICATIONS

"CodeRun IDE: Free Web Based IDE for Developers," [http://www.makeuseof.com/dir/coderun-web-based-ide/], Nov. 2009, p. 1-7.*

Bokowski, Boris, "Eclipse in the Cloud," https://borisoneclipse.blogspot.com/2009/02/eclipse-in-cloud.html, Feb. 17, 2009, accessed Dec. 16, 2010, 5 pages.

Nackman, Lee R., "CodeStore and Incremental C++," Dr. Dobb's The World of Software Development, http://www.drdobbs.com/article/print?articleId=184410345&siteSectionName=, Dec. 1, 1997, accessed Apr. 5, 2011, 6 pages.

Slangen, Simon, "The Top 3 Browser-Based IDE's to Code in the Cloud," MakeUseOf, http://www.makeuseof.com/tag/top-3-browser-based-ides-code-cloud-2, Mar. 23, 2010, accessed on Dec. 16, 2010, 8 pages.

"C++Builder XE-Frequently Asked Questions," Embarcadero Technologies, Inc., http://www.embarcadero.com/products/cbuilder/faq, Dec. 16, 2010, 19 pages.

"C++Builder XE-Frequently Asked Questions," Embarcadero Technologies, Inc., http: // http://web.archive.org/web/20100714072112/http://www.embarcadero.com/products/cbuilder/faq, Jul. 14, 2010, accessed Nov. 16, 2011, 8 pages.

Java API User Guide, pp. 1-11, http://www.progress.com/realtime/techsupport/documentation/objectstore/r60/osji/doc.a p 2003, accessed Dec. 16, 2010, 11 pages.

"Towards a New Paradigm for C++ Program Development," Advogato, http://www.advogato.org/article/718.html, Oct. 11, 2003, accessed on Dec. 16, 2010, 12 pages.

"Visual Age® C++ Professional for OS/2® and for Windows NT® Version 4.0," IBM, 1998, 2 pages.

"Virtual Machine," From Wikipedia, the free encyclopedia, http://en.wikipedia.org/wiki/Virtual_machine, last modified on Jul. 25, 2011, accessed on Jul. 26, 2011, 9 pages.

"Virtual Machine," From Wikipedia, the free encyclopedia, http://web.archive.org/web/20100209074554/http://en.wikipedia.org/wiki/Virtual_machine, last modified on Feb. 7, 2010, accessed on Nov. 16, 2011, 8 pages.

Nagel, William, "Subversion Version Control", Prentice Hall Technical Reference, http://www.ptgmedia.pearsoncmg/images/03185182/downloads/Nagel_book.pdf, pp. 1-343, retrieved Nov. 30, 2011.

Tolia, et al., "Quantifying Interactive User Experience on Thin Clients", Technical Report, Carnegie Mellon University, published online, http://www.repository.cmu.edu/cgi/viewcontent.cgi?article=1072&context=compsci, pp. 46-52, retrieved Dec. 6, 2011.

Spencer, Greg, co-pending U.S. Appl. No. 13/245,030, filed Sep. 26, 2011.

Office Action issued in co-pending U.S. Appl. No. 13/245,030, mailed Dec. 16, 2011.

* cited by examiner

INTEGRATED DEVELOPMENT ENVIRONMENT WITH NETWORK-BASED COMPILATION AND SANDBOXED NATIVE MACHINE-LANGUAGE CAPABILITIES

BACKGROUND

Distributed computing allows a local machine to take advantage of network resources. For example, one type of distributed computing is cloud computing. Cloud computing is location-independent computing. In cloud computing, shared servers provide resources, software, and data to computers and other devices on demand. Cloud computing is a result of virtualization, service-oriented architecture, and utility computing. Cloud computing typically involves over-the-Internet provision of resources.

Certain programming languages, such as JAVA and C#, may operate on virtual machines. JAVA may use the JAVA Virtual Machine and C# may use the Common Language Runtime of the .NET Framework. The use of a virtual machine provides certain forms of protection when JAVA or C# code is executed. However, these virtual machines disfavor ahead-of-time compilation that produces native machine language code. Native machine language code can increase performance by directly accessing system resources in optimized ways.

However, the power of machine language and its ability to directly access system resources present a security risk. Unless protective measures are taken, machine language may access system resources in undesirable ways that may jeopardize system security or stability.

BRIEF SUMMARY

By using network technology to facilitate compilation using the advantages of services hosted by the network, performance may be improved. Additionally, providing the capability to generate native machine language with the protection of a sandboxed environment could improve the performance and security of code generated by such an IDE.

Embodiments relate to accessing an IDE at a web browser that is supported by a network. Such an IDE is capable of controlling the network to generate compiled native machine language to be executed in a sandboxed environment.

According to an exemplary embodiment, a computer-implemented method, system, and a computer-readable storage medium provide an integrated development environment (IDE) on a client machine with network-based compilation and sandboxed execution. An IDE is provided by a web browser on a client machine, the IDE having a document editor that allows a user to generate source code. The source code is transmitted from the client machine to one or more servers via a network connection to be compiled into compiled native machine instructions. The compiled native machine instructions machine instructions are received from the one or more servers by the client machine. The compiled native machine instructions are executed in a sandboxed environment on the client machine, wherein system calls originating from the compiled native machine instructions that present a security risk are blocked using the sandboxed environment and system calls originating from the compiled native machine instructions that do not present a security risk are allowed in the sandboxed environment.

While prior approaches have been developed to provide a sandboxed environment for use in conjunction with native machine instructions, embodiments described herein add to such functionality by using a web-based IDE to generate source code that is transformed in the network into native machine instructions for such a sandboxed native execution environment.

According to another exemplary embodiment, a computer-implemented method, system, and a computer-readable storage medium use one or more servers to compile source code for an IDE provided by a web browser at a client machine with sandboxing capabilities. Source code is received from an IDE provided by a web browser on the client machine, by the one or more servers. The source code is compiled by the one or more servers into compiled native machine instructions. The compiled native machine instructions are transmitted from the one or more servers to the client machine for execution in a sandboxed environment on the client machine, the sandboxed environment blocking system calls originating from the compiled native machine instructions that present a security risk and the sandboxed environment allowing system calls originating from compiled native machine instructions that do not present a security risk in the sandboxed environment. These embodiments similarly add functionality to such a sandboxed environment by using a web-based IDE to generate source code that is transformed in the network into compiled native machine instructions for such a sandboxed native execution environment.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the subject of the present application and, together with the description, further serve to explain the principles of the subject of the present application and to enable a person skilled in the pertinent art to make and use the subject of the present application.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments, whether or not explicitly described.

Each of the constituent parts of a system embodiment may be implemented on any computing device. Such computing device may include, but is not limited to, a personal computer, mobile device such as a mobile phone, workstation, embedded system, game console, television, set-top box, or any other computing device. Further, a computing device may include, but is not limited to, a device having a processor and memory for executing and storing instructions. Software may include one or more applications and an operating system. Hardware may include, but is not limited to, a processor, memory and graphical user interface display. The computing device may also have multiple processors and multiple shared or separate memory components. For example, the computing device may be a clustered computing environment or server farm.

Various components of a system embodiment may be implemented in hardware, software, firmware, or any combination thereof. Likewise, modules or instructions that constitute operative parts of embodiments may utilize any type of structured memory, including a persistent memory. In examples, each data storage infrastructure may be implemented as a relational database.

Figure 1:
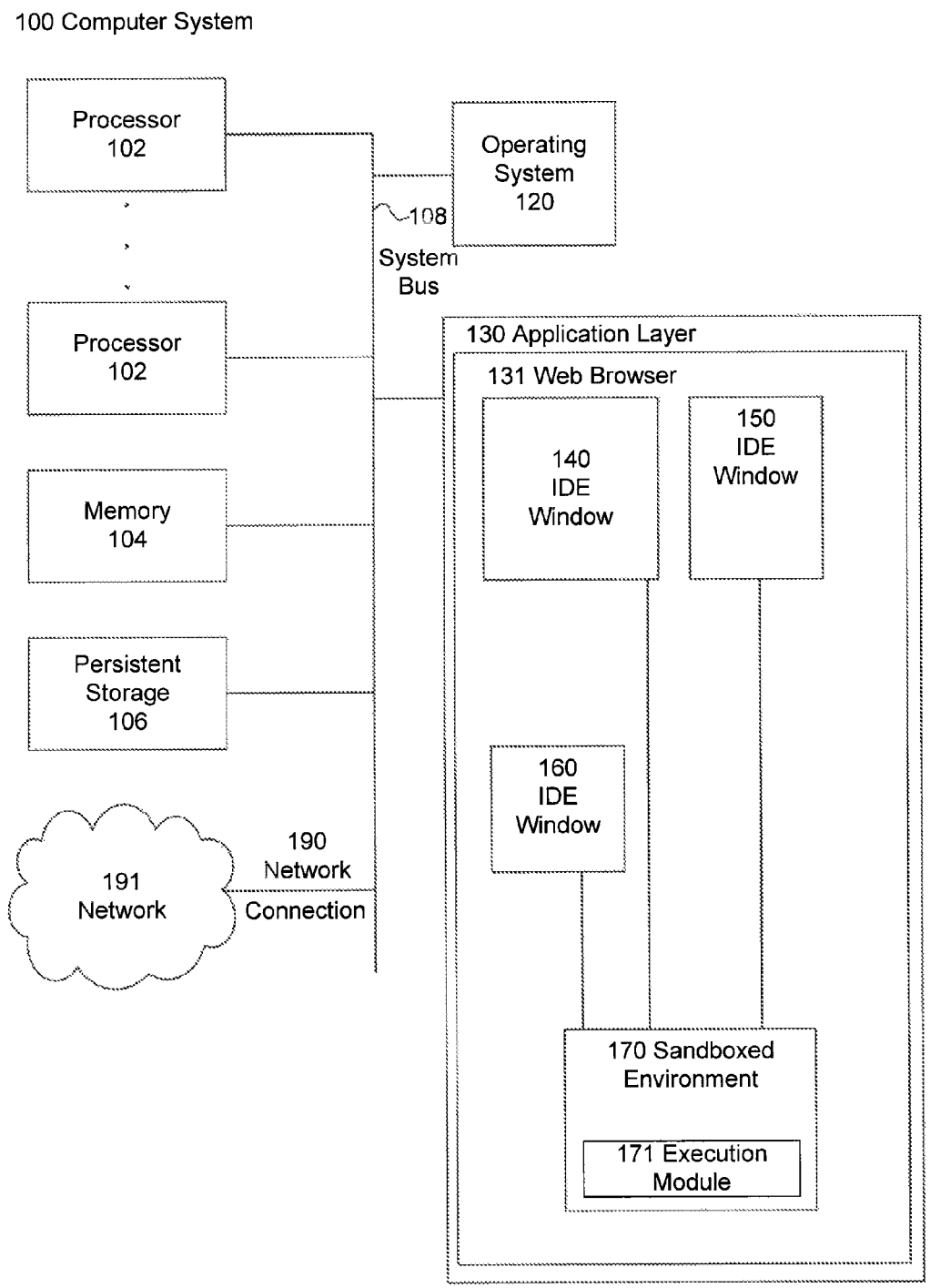
FIG. 1 is a diagram illustrating a client system, according to an embodiment.

FIG. 1 is a diagram illustrating a client system, according to an embodiment.

The processing task in the embodiment of FIG. 1 is carried out by one or more processors 102. It should be noted that any type of processing technology may be used here. Examples include: multi-core processors, multiple processors, or distributed processors. Additional specialized processing resources such as graphics, multimedia, or mathematical processing capabilities. Such resources may consist of hardware, software, or both.

In order to manipulate data to act as an embodiment, processors 102 access a memory 104 via system bus 108. For data that needs to be stored more permanently, the processor accesses persistent storage 106. Processors 102, memory 104 and persistent storage 106 operate in coordination with operating system 120 to provide basic functionality for computing device 100. Operating system 120 provides support functionality for an applications layer 130, including a web browser 131.

Computing device 100 may use a network connection 190 to communicate with other processing machines via a network 191. Network connection 190 may be an appropriate wired connection. Similarly, appropriate wireless technology may be used to act as network connection 190 to access network 191. Network 191 may be the Internet, a local area network, or any other network 191 of machines with which computing device 100 may exchange data.

Web browser 131 may include a variety of viewing areas. The viewing areas generally include windows and tabs. FIG. 1 includes three IDE windows from an exemplary embodiment: IDE window 140, IDE window 150, and IDE window 160. These IDE windows 140, 150, 160 are examples of windows in web browser 131 that will provide the user with a graphical user interface for IDE windows 140, 150, 160 to access.

Various types of users may utilize aspects of various embodiments in different ways. For example, programmers may use an embodiment to generate and compile source code, while end users may execute compiled source code. In general, however, it should be understood that embodiments may be used by any type of user that wishes to take advantage of the functionality they provide. However, it will also be recognized that certain types of users may find specific features useful. For example, groups of programmers may find the distributed nature of the compiler to be especially helpful. In general, the term "user" as used throughout this application should be read broadly as any user who wishes to take advantage of features of a specific embodiment.

An exemplary embodiment has been provided using windows in a GUI. However, other types of viewing areas, such as tabs in web browser 131, may serve to operate an IDE. These viewing areas are subdivisions of the display area that displays each exemplary IDE window 140, 150, 160 in web browser 131.

In embodiments, IDE windows 140, 150, 160 use client-side technology, server-side technology, peer-to-peer technology, or any appropriate combination. Such technology may facilitate generating, organizing, and maintaining source code in an IDE window 140. IDE window 140 of the embodiments may also include other capabilities. For example, IDE window 140 may offer the ability to execute the source code as discussed below in a sandboxed environment 170, provide debugging facilities, and provide organizational tools for source code.

FIG. 1 also provides that the one or more IDE windows 140, 150, 160 may be connected to sandboxed environment 170 where the source code may run once it has been compiled. Sandboxed environment 170 contains an execution module 171 that receives compiled native machine instructions from network 191 via network connection 190 that conveys the compiled native machine instructions into web browser 131. The compiled native machine instructions are considered "native" in that they are designed to be run directly on a particular type of processing architecture, such as the INTEL x86 architecture. The use of compiled native machine instructions allows optimization of source code in ways that improves performance, but it is also important that compiled native machine instructions be constrained, as discussed below in conjunction with the use of the sandboxed environment, to avoid security threats.

Web browser 131 conveys the compiled native machine instructions to execution module 171. Execution module 171 allows the source code to run safely while taking advantage of the greater efficiency, flexibility, and speed that compiled native machine instructions offer. Thereafter, the compiled native machine instructions may execute in sandboxed environment 170 that contains execution module 171. Sandboxed environment 170 protects the client computer system 100 from dangerous effects of the machine instructions.

Sandboxed environment 170 may block system calls originating from the compiled native machine instructions that present a security risk. Similarly, sandboxed environment 170 may allow system calls originating from the compiled native machine instructions that do not present a security risk. The sandboxed environment accomplishes this goal by identifying instructions that access resources in a way that pose risks such as threatening instability or divulging private information. Sandboxed environment 170 may operate by establishing a set of certain method calls that are considered security risks or establishing a set of certain parameter values that make specific method calls security risks. An alternative approach for use in certain embodiments, software-based fault isolation, is discussed below.

Once sandboxed environment 170 has identified risky instructions, sandboxed environment 170 may block system calls that present a security risk. However, sandboxed environment 170 may also be constructed in a way to provide greater flexibility for the user (albeit with certain risks) and allow selective access to system calls in the sandboxed environment. The selective access may occur by having the user make annotations in the source code, or otherwise notify IDE windows 140, 150, 160 that certain compiled native machine instructions are to be executed even though it may pose a security risk. Alternatively, only compiled native machine instructions that are confirmed as safe may be allowed to execute.

Computer system 100 may provide a warning in web browser 131 when the user is about to override the boundaries of sandboxed environment 170 so that the overriding does not occur inadvertently.

Sandboxed environment 170 may provide a tightly-controlled set of resources for guest programs to run in, such as scratch space on disk and memory. Network access, the ability to inspect the host system or read from input devices may be disallowed or heavily restricted. In this sense, sandboxes are a specific example of virtualization, and the sandbox is similar to a virtual machine. However, the resources need not be as tightly controlled if sandboxed environment 170 provides for blocking system calls that would potentially present a security risk.

A virtual machine (VM) is a software implementation of a machine (e.g., a computer) that executes programs like a physical machine. Use of a virtual machine to provide this functionality is called virtualization. Virtual machines are separated into two major categories, system virtual machines and process virtual machines. These embodiments provide for a system virtual machine. A system VM provides a complete system platform that supports the execution of a complete operating system (OS).

A characteristic of the sandboxed environment is that, like virtual machines, it is limited to the resources and abstractions provided by the sandboxed environment. It may not invade other resources on the host machine. The sandboxed environment may provide access to greater execution speeds by interfering as little as possible with the native code. Such access, in certain embodiments, may use software-based fault isolation as described below to ensure that only safe instructions can access memory in a vulnerable way.

A technology that may be used for sandboxing in conjunction with web browser 131 in an exemplary embodiment is a native client module that uses fault isolation. An example native client may use sandboxing technology for running native code, such as a subset of INTEL x86 native code using software-based fault isolation. Software-based fault isolation is a technique of memory management that insulates different types of memory usage from one another. Software-based fault isolation protects memory while minimizing the impact on performance. Software-based fault isolation may aid in the protective aspects of the sandboxing, as discussed below.

Thus, by using software-based fault isolation, a native client module may safely run native code from a web browser. Such a use of a native client module allows web-based applications to run at near-native speeds. In an exemplary embodiment the native client module may execute on a web browser executing on an operating system on a specific architecture, such as x86 hardware.

Various architectures may use native client modules adapted to their individual instruction sets. Note, however, that a native client module will be adapted to run code compiled to a specific architecture and instruction set.

The exemplary x86 implementation of a native client module described herein can be used with sandboxing techniques that makes use of the x86's segmentation facility. Such a native client module sets up x86 segments to restrict the memory range that the sandboxed code may access. The native client module uses a code verifier to prevent the use of unsafe instructions such as instructions that perform system calls. Use of the code verifier prevents the code from jumping to an unsafe instruction hidden in the middle of a safe instruction. To enforce this requirement, the native client module may require that all indirect jumps be jumps to the start of 32-byte aligned blocks. Instructions are not allowed to straddle these blocks. Because of these constraints, code must be recompiled to run under a native client module, which may provide a customized set of compilers. In this manner, calls are restricted to areas of memory that are safe while taking advantage of the x86 architecture that supports this type of memory management, in that there is a minimal impact on performance.

Thus, a native client module or a similar sandboxing facility may be used to provide sandboxing environment 170 and execution module 171 that isolate compiled code. The code may run safely in a sandboxed environment 170 while providing near-native performance.

Although certain native client modules and sandboxing facilities exist, embodiments described herein add to their functionality by using the network to provide the compiled native machine instructions that are run in the sandboxed environment.

Figure 2:
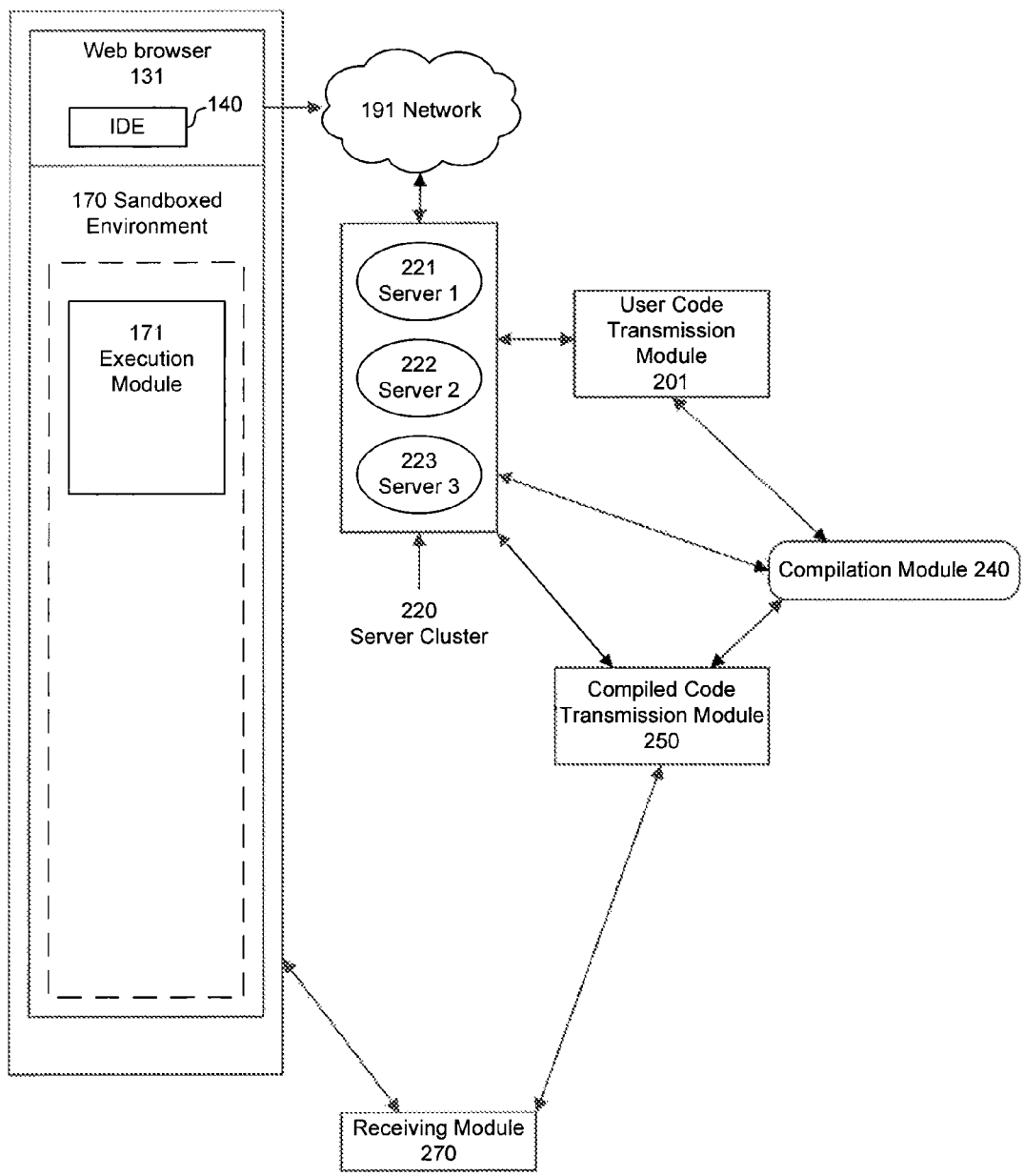
FIG. 2 is a diagram of a client system and a network, according to an embodiment.

FIG. 2 is a diagram of a client system and a network, according to an embodiment.

Computer system 100 is illustrated in part in FIG. 2. Computer system 100 includes a web browser 131 that provides IDE 140, and also provides sandboxed environment 170. Sandboxed environment 170 establishes a security perimeter to protect web browser 131 from dangerous instructions that originate in execution module 171.

The control flow through FIG. 2 operates as follows. IDE 140 that operates at web browser 131 may be connected via network 191 to a server cluster 220. Server cluster 220 is distributed over one or more server machines, such as servers 221, 222, 223. Server cluster 220 provides services to the computer system 100. While this network is characterized as a client-server network, a peer-to-peer architecture, or any alternative architecture which provides access to services by a resource consumer may be used in embodiments. Also, while an exemplary embodiment provides for a server cluster 220 of multiple servers, another embodiment may include only a single server, such as server 221.

The server cluster 220 then processes the code. Server cluster 220 receives code, transmitted via a user code transmission module 201 from IDE 140. The code is transmitted to a compilation module 240. Compilation module 240 compiles the source code into compiled native machine instructions. Compilation module 240 may additionally perform other tasks necessary to prepare the code for execution, such as preprocessing or linking. Compiled code transmission module 250 transmits the compiled native machine instructions from server cluster 220 to a receiving module 270. Receiving module 270 receives the compiled native machine instructions from server cluster 220 for client computer system 100. The compiled native machine instructions are then executed by execution module 171 that resides within sandboxed environment 170, sandboxed environment 170 regulating the execution of system calls.

Figure 3:
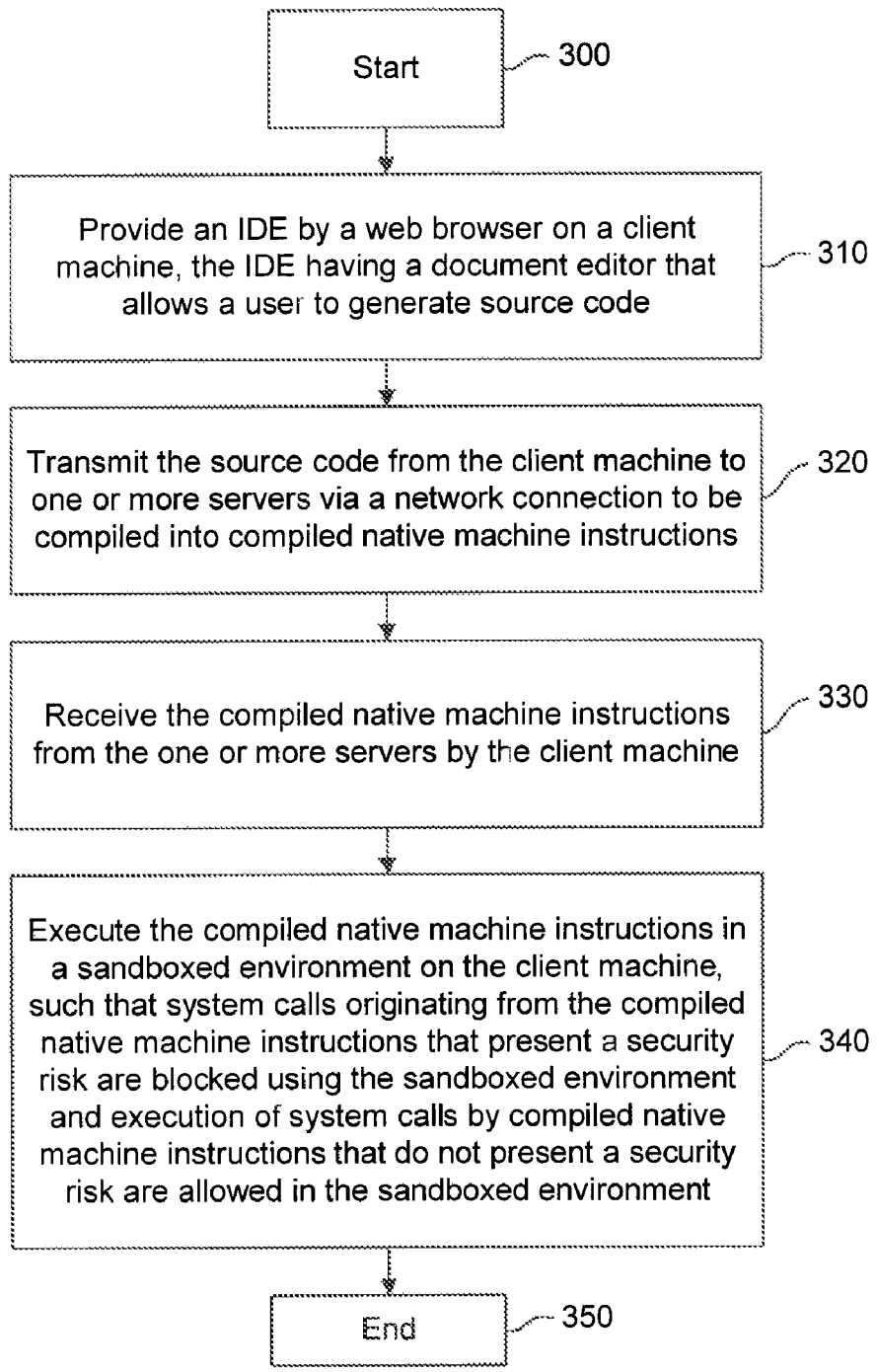
FIG. 3 is a flowchart of a client-based method, according to an embodiment.

FIG. 3 is a flowchart of a client-based method, according to an embodiment. The method begins at stage 300, Start.

Stage 310 includes providing an IDE by a web browser on a client machine, the IDE having a document editor that allows a user to generate source code. Stage 310 may occur at web browser 131 and IDE 140, in an embodiment.

Stage 320 includes transmitting the source code from the client machine to one or more servers via a network connection to be compiled into compiled native machine instructions. Stage 320 may occur via network connection 190, network 191, and user code transmission module 201 in conjunction with server cluster 220, in an embodiment.

Stage 330 includes receiving the compiled native machine instructions from the one or more servers by the client machine. Stage 330 may occur through the operation of user code transmission module 201 in conjunction with servers such as servers 221, 222, 223 in server cluster 220, in an embodiment.

Stage 340 includes executing the compiled native machine instructions in a sandboxed environment on the client machine wherein system calls originating from the compiled native machine instructions that present a security risk are blocked using the sandboxed environment, and system calls by compiled native machine instructions that do not present a security risk are allowed in the sandboxed environment. Stage 340 may occur at sandboxed environment 170 and execution module 171, in an embodiment.

The method ends in stage 350, End.

Figure 4:
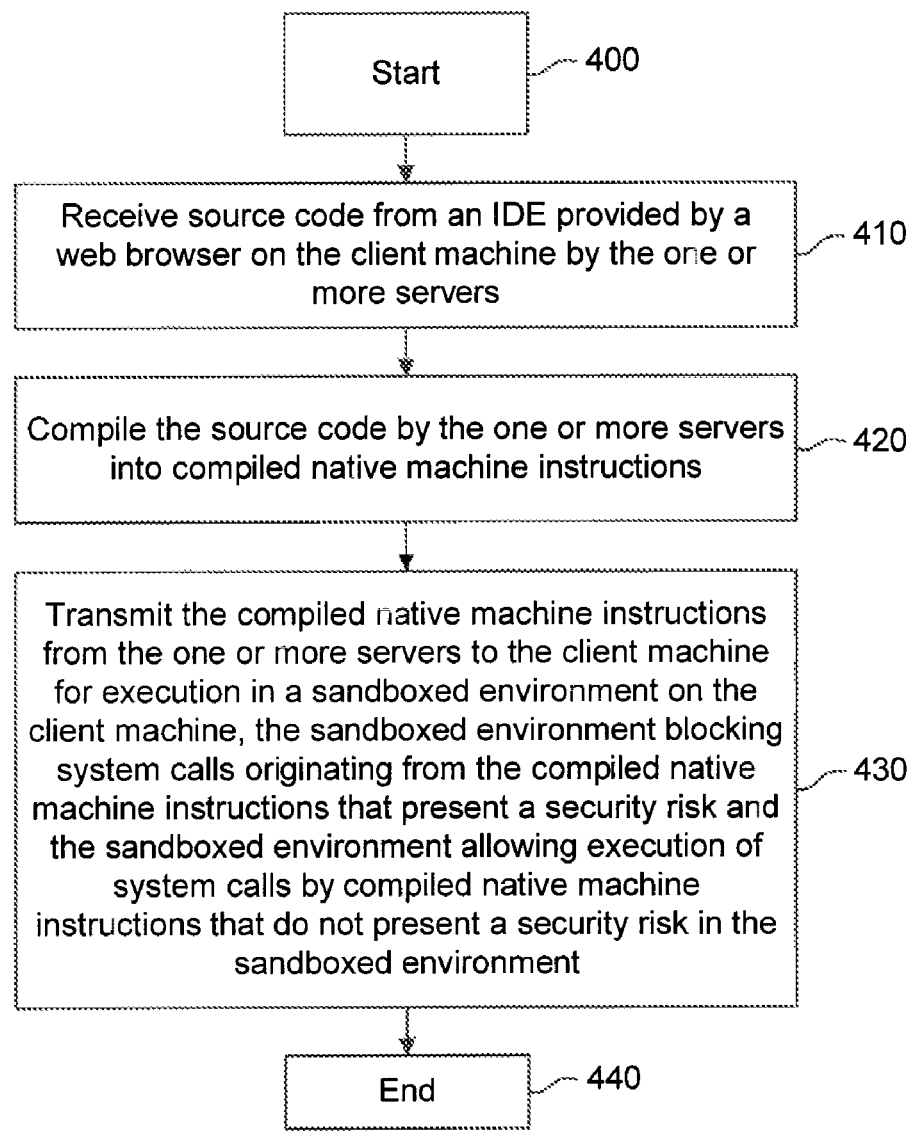
FIG. 4 is a flowchart of a server-based method, according to an embodiment.

FIG. 4 is a flowchart of a server-based method, according to an embodiment. The method begins at stage 400, Start.

Stage 410 includes receiving source code from an IDE provided by a web browser on the client machine, by the one or more servers. Stage 410 may occur between IDE 140, web browser 131, network connection 190, network 191, server cluster 220, servers 221, 222, 223, and user code transmission module 201, in an embodiment.

Stage 420 includes compiling the source code by the one or more servers into compiled native machine instructions. Stage 420 may involve server cluster 220, servers 221, 222, 223, and user code compilation module 240, in an embodiment.

Stage 430 includes transmitting the compiled native machine instructions from the one or more servers to the client machine for execution in a sandboxed environment on the client machine, the sandboxed environment blocking system calls originating from the compiled native machine instructions that present a security risk and the sandboxed environment allowing system calls originating from the compiled native machine instructions that do not present a security risk in the sandboxed environment. Stage 430 may involve compiled code transmission module 250, in an embodiment.

The method ends in stage 440, End.

The computer-implemented method and system embodiments provided for by this application may involve additional functionality, in addition to the stages provided for in FIG. 3 and FIG. 4. For example, compiling may include distributing compilation of the source code into compiled native machine instructions across multiple servers. Further transmitting may include consolidating the compiled native machine instructions to be executed at client machine 100.

Another embodiment may include real-time compiling as the user generates the code. In this embodiment, the one or more servers 221, 222, 223 continually monitor the source code in the background. The one or more servers 221, 222, 223 perform preprocessing, compilation, and linking as the user edits the code using techniques of multitasking or multithreading. This feature allows the user to continually have access to a compiled and linked executable version of the source code. Such a version evolves as the user creates the code, which allows for convenient code testing and execution.

Thus, computer system 100 accesses IDE 140 to facilitate the user's entry of source code. The compilation occurs over the network. The additional tasks of preprocessing and linking (not shown) may additionally help transform the user's source code into compiled native machine instructions. Over the network, preprocessing, compiling, and linking transform the source code entered via IDE window 140 into compiled native machine instructions. These compiled native machine instructions may then be executed at a client machine 100 in execution module 171 in sandboxed environment 170. For example, combining the power of networks and sandboxing facilitates the software development cycle in several ways. First of all, the use of a network as a service rather than simply operating at a local machine provides resources that may increase the reliability and fault-tolerance of the development process. One way in which it does this is by providing automatic backups and redundancy. Servers may also take over responsibility for the computing tasks that would otherwise require the attention of the clients. Examples include lightening the processing, memory, and storage burdens on the clients. Thus, servers may allow for a speedup in preprocessing, compiling, and linking. The greater storage facilities of servers may also aid in version control, and deploying the compiler across networks may aid in collaborative programming tasks.

Moreover, sandboxing facilitates being able to ran compiled native machine instructions in a safe manner. By using techniques that use capabilities of the x86 instruction set, for example, to require safe memory access, safe system method calling may occur with only minimal overhead. Thus, embodiments provide for the speed and optimization of native machine code, but the sandbox intervenes to guarantee code safety.

The use of networks and sandboxing combine to reinforce each other. Users may use an IDE executing in a web browser to facilitate editing of code at the client level while permitting distributed compilation and redundant storage. When the code is actually run, sandboxing it allows near-native performance. Thus, users may combine a network compiler, where code is constantly compiled in the background with near-native performance of the code in the sandbox. Such a combination allows for embodiments that achieve the security of a sandboxed virtual machine while simultaneously having the reliability and efficiency of a network implementation. Thus, the embodiments include several features that may be of great help in the software development process.

The Summary and Abstract sections may set forth one or more but not all exemplary embodiments of the present invention as contemplated by the inventor, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for providing an integrated development environment (IDE) on a client machine with network-based compilation and sandboxed execution, comprising:
    providing an IDE by a web browser on a client machine, the IDE having a document editor that allows a user to generate source code;
    transmitting the source code from the client machine to one or more server machines via a network connection to be compiled into compiled native machine instructions;
    receiving the compiled native machine instructions from the one or more server machines by the client machine for execution in a sandboxed environment; and
    executing the compiled native machine instructions in the sandboxed environment, the sandboxed environment executing on the client machine, wherein execution of system calls originating from the compiled native machine instructions that present a security risk are blocked using the sandboxed environment and execution of system calls originating from the compiled native machine instructions that do not present a security risk are allowed in the sandboxed environment.

2. The computer-implemented method of claim 1, further comprising:
    allowing execution of blocked system calls that are selected by the user.

3. The computer-implemented method of claim 1, further comprising:
    distributing, by the client machine, compilation of the source code into compiled machine language instructions across multiple server machines, and wherein receiving comprises receiving the compiled native machine instructions and consolidating them to be executed.

4. The computer-implemented method of claim 1, further comprising:
    transmitting the source code to the one or more server machines to be compiled in real-time as the user generates the source code.

5. A computer-implemented method for using one or more server machines to compile source code for an integrated development environment (IDE) provided by a web browser at a client machine with sandboxing capabilities, comprising:
    receiving the source code from the IDE provided by the web browser on the client machine by the one or more server machines;
    compiling the source code by the one or more server machines into compiled native machine instructions; and
    transmitting the compiled native machine instructions from the one or more server machines to the client machine for execution in a sandboxed environment, the sandboxed environment executing the compiled native machine instructions, the sandboxed environment executing on the client machine, the sandboxed environment blocking execution of system calls originating from the compiled native machine instructions that present a security risk and the sandboxed environment allowing execution of system calls originating from the compiled native machine instructions that do not present a security risk in the sandboxed environment.

6. The computer-implemented method of claim 5, further comprising:
    distributing compilation of the source code into compiled machine language instructions across multiple server machines, and wherein transmitting comprises consolidating the compiled native machine instructions to be executed at the client machine.

7. The computer-implemented method of claim 5, further comprising:
    compiling the source code in real-time as a user generates the source code.

8. A system for providing an integrated development environment (IDE) on a client machine with network-based compilation and sandboxed execution, comprising:
    a processor;
    a web browser on a client machine configured to use the processor to provide an IDE, the IDE having a document editor that allows a user to generate source code;
    a user code transmission module configured to use the processor to transmit the source code from the client machine to one or more server machines via a network connection to be compiled into compiled native machine instructions;
    a receiving module configured to use the processor to receive the compiled native machine instructions from the one or more server machines by the client machine for execution in a sandboxed environment; and
    an execution module configured to use the processor to execute the compiled native machine instructions in the sandboxed environment, the sandboxed environment executing on the client machine, wherein execution of system calls originating from the compiled native machine instructions that present a security risk are blocked using the sandboxed environment and execution of system calls originating from the compiled native machine instructions that do not present a security risk are allowed in the sandboxed environment.

9. The system of claim 8, wherein the execution module is further configured to use the processor to allow execution of blocked system calls that are selected by the user.

10. The system of claim 8, wherein the user code transmission module is further configured to use the processor to distribute the source code across the one or more server machines to be compiled into machine instructions and the receiving module is further configured to use the processor to receive the compiled native machine instructions from the one or more server machines and consolidate them for execution by the client machine.

11. The system of claim 8, wherein the user code transmission module is further configured to use the processor to transmit the source code to the one or more server machines to be compiled in real-time as the user generates the source code.

12. A computer readable storage device having instructions stored thereon, that, when executed by a processor, cause the processor to perform operations for providing an integrated development environment (IDE) on a client machine with network-based compilation and sandboxed execution, the operations comprising:
    providing an IDE by a web browser on a client machine, the IDE having a document editor that allows a user to generate source code;
    transmitting the source code from the client machine to one or more server machines via a network connection to be compiled into compiled native machine instructions;

receiving the compiled native machine instructions from the one or more server machines by the client machine for execution in a sandboxed environment; and executing the compiled native machine instructions in the sandboxed environment, the sandboxed environment executing on the client machine, wherein execution of system calls originating from the compiled native machine instructions that present a security risk are blocked using the sandboxed environment and execution of system calls originating from the compiled native machine instructions that do not present a security risk are allowed in the sandboxed environment.

13. The computer readable storage device of claim 12, the operations further comprising:

allowing execution of blocked system calls that are selected by the user.

14. The computer readable storage device of claim 12, the operations further comprising:

distributing, by the client machine, compilation of the source code into compiled machine language instructions across multiple server machines, and wherein receiving comprises receiving the compiled native machine instructions and consolidating them to be executed.

15. The computer readable storage device of claim 12, the operations further comprising:

transmitting the source code to the one or more server machines to be compiled in real-time as the user generates the source code.

* * * * *